No. 823,565. PATENTED JUNE 19, 1906.
H. TURTON.
BRIDLE BIT.
APPLICATION FILED DEC. 5, 1905.
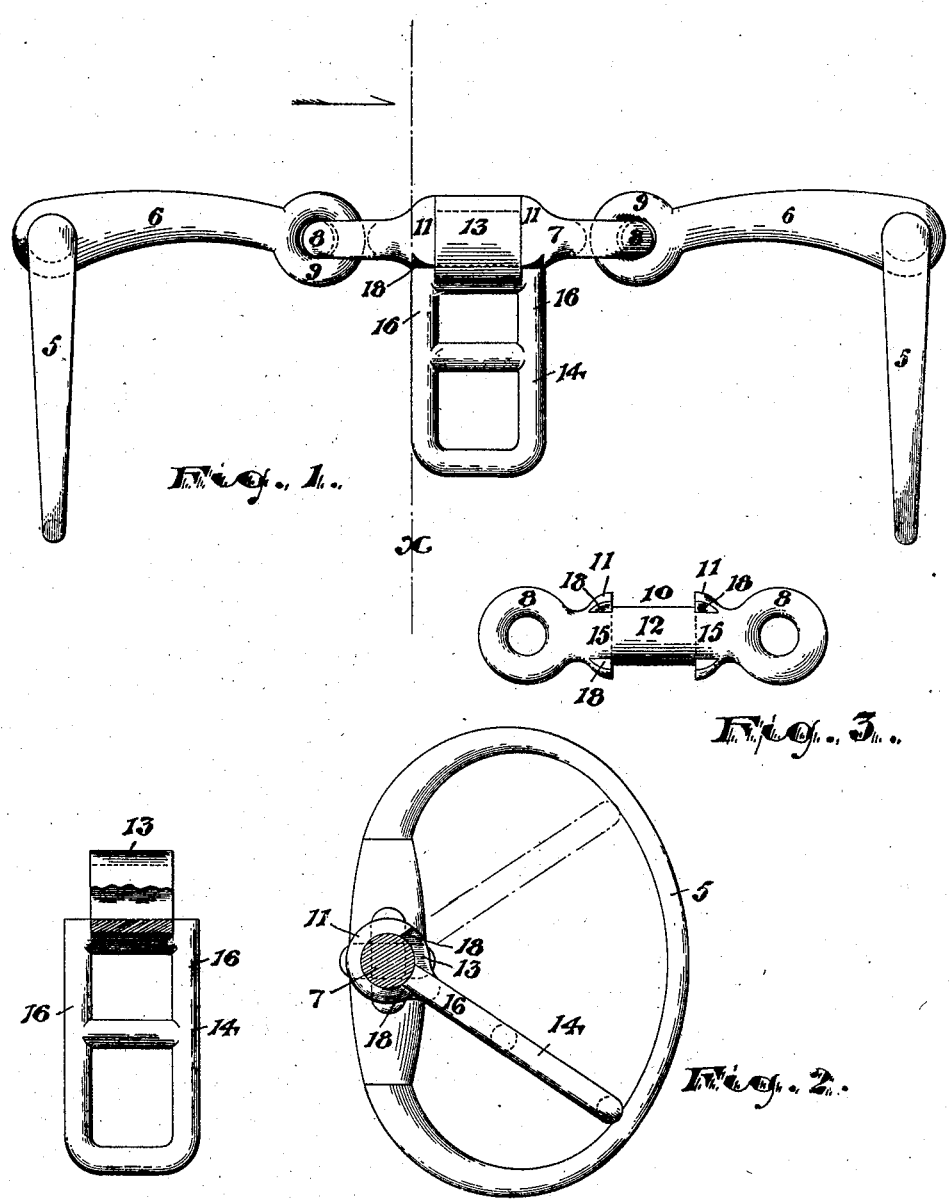

UNITED STATES PATENT OFFICE.

HARRY TURTON, OF NEWARK, NEW JERSEY, ASSIGNOR TO AUGUST BUERMANN, OF NEWARK, NEW JERSEY.

BRIDLE-BIT.

No. 823,565.        Specification of Letters Patent.        Patented June 19, 1906.

Application filed December 5, 1905. Serial No. 290,345.

*To all whom it may concern:*

Be it known that I, HARRY TURTON, a citizen of the United States, residing at Newark, in the county of Essex and State of New Jersey, have invented certain new and useful Improvements in Bridle-Bits; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide a bit that will be more effective in curbing a horse by pressing against the animal's tongue, thereby preventing him from grasping the mouthpiece of the bit between his teeth; to secure a freedom of the projecting tongue adapted to press upon the tongue of the animal, thereby relieving the animal from undue pressure when the bit is not serving its curbing functions; to limit the free movement of said tongue, but permit the animal to play with the pressure-tongue with its tongue; to provide a simple and inexpensive structure, and to obtain other advantages and results, some of which may be referred to hereinafter in connection with the description of the working parts.

The invention consists in the improved bridle-bit and in the arrangements and combinations of parts of the same, all substantially as will be hereinafter set forth and finally embraced in the clauses of the claim.

Referring to the accompanying drawings, in which like numerals of reference indicate corresponding parts in each of the several figures, Figure 1 is a plan of the improved bit. Fig. 2 is a section of the same, taken on line *x*. Fig. 3 is a detail view of the center link of the mouthpiece, and Fig. 4 is a detail view of the pressure-tongue adapted to be arranged upon said center link.

In said drawings 5 5 indicate the cheek-pieces or rein-rings of the bit. 6 6 are the end sections of the mouthpiece, and 7 is a center section of said mouthpiece, which latter is linked to the end sections 6 6, connecting the same to complete the connection of the rein-rings. The mouthpiece sections or links 6 6 and 7 are each provided with eyes 8 9, which are linked together, as shown, so as to permit only a limited turning of the center link on its longer axis independent of the end links or sections. The center link is centrally recessed or reduced in thickness, as at 10 in Fig. 3, forming flanges 11 11 and a pivot 12 between said flanges. On said pivot 12 is arranged the pivotal eyes 13 of the pressure-tongue 14. The flanges 11 are themselves recessed or are discontinuous, as at 15, and the side bars 16 of the pressure-tongue at their ends enter the recesses 15 and are permitted but a limited movement therein. Thus the said side bars 16 engage the ends of the flanges, which latter form stops 18, and the tongue 14 is permitted to oscillate on the pivot 12 of the center section or link, so that the horse may move the pressure-tongue and not be inconvenienced by the same under ordinary conditions; but when there is need of curbing the said tongue may be brought hard against the tongue of the animal by action of the reins.

Having thus described the invention, what I claim as new is—

1. An improved bit having a tongue pivotally arranged at its center, and stops on the bit to limit the movement of the tongue.

2. An improved bit having three mouthpieces linked together, the center mouthpiece having a tongue pivoted thereon, and stops on the center mouthpiece to limit the swinging of the tongue.

3. An improved bit having end mouthpieces, and a center mouthpiece linked to the end mouthpieces, a tongue having an eye embracing the center mouthpiece, and stops on the center mouthpiece limiting the movement of the tongue.

In testimony that I claim the foregoing I have hereunto set my hand this 27th day of November, 1905.

HARRY TURTON.

Witnesses:
     CHARLES H. PELL,
     M. V. DOYLE.